US008370017B2

(12) United States Patent
Weber et al.

(10) Patent No.: US 8,370,017 B2
(45) Date of Patent: Feb. 5, 2013

(54) SMART VEHICLE SENSOR

(75) Inventors: Dave Charles Weber, Toledo, OH (US); David John Kubinski, Canton, MI (US); Michiel J. Van Nieuwstadt, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 630 days.

(21) Appl. No.: 12/501,697

(22) Filed: Jul. 13, 2009

(65) Prior Publication Data

US 2011/0010035 A1 Jan. 13, 2011

(51) Int. Cl.
*G01N 25/00* (2006.01)

(52) U.S. Cl. ...................................... 701/29.1; 123/295

(58) Field of Classification Search .................... 701/29, 701/29.1, 100–102, 109, 30.5; 60/280, 284–286, 60/295, 297, 311, 277, 276; 123/295, 299, 123/300

See application file for complete search history.

(56) References Cited

U.S. PATENT DOCUMENTS

| | | | | |
|---|---|---|---|---|
| 5,857,777 | A | 1/1999 | Schuh | |
| 5,918,260 | A * | 6/1999 | Newman et al. | 73/31.05 |
| 6,345,499 | B1 * | 2/2002 | Nishimura et al. | 60/277 |
| 6,666,201 | B1 * | 12/2003 | Mazur | 123/698 |
| 7,050,902 | B1 | 5/2006 | Bolz | |
| 7,320,215 | B2 | 1/2008 | Colignon | |
| 7,958,720 | B2 * | 6/2011 | Okamoto et al. | 60/284 |
| 2010/0101314 | A1 * | 4/2010 | Sasaki et al. | 73/114.75 |

FOREIGN PATENT DOCUMENTS

| | | |
|---|---|---|
| EP | 1 102 048 | 5/2001 |

* cited by examiner

*Primary Examiner* — Dalena Tran

(74) *Attorney, Agent, or Firm* — Julia Voutyras; Alleman Hall McCoy Russell & Tuttle LLP

(57) ABSTRACT

Various systems and methods are described for controlling operation of a motor vehicle based on a sensor. One example method comprises receiving sensed parameter data from the sensor, receiving calibration data from the sensor, and adjusting a vehicle operating parameter in response to the sensed parameter data and the calibration data.

16 Claims, 9 Drawing Sheets

SMART VEHICLE SENSOR

TECHNICAL FIELD

The present application relates generally to systems and methods for an exhaust gas sensor for measuring exhaust gas constituents from an internal combustion engine.

BACKGROUND AND SUMMARY

Upon cold start of a motor vehicle, there is an amount of time in which components such as exhaust gas constituent sensors warm up to their respective operating temperatures (e.g, light-off time). During this time, a sensor signal may be unstable and the sensor measurements may be inaccurate. In particular, while manufacturing processes may be developed that enable the sensor to sensor variation to be maintained at an acceptably low level for the sensor performance upon reaching light-off, sensor to sensor variation may have a significant impact on sensor response during the light-off time. As a result, the sensor signal may not be usable until after light-off of the sensor has occurred.

The inventors herein have recognized the above problems and have devised various approaches to at least partially address them. Thus, in one example, a sensor is provided, the sensor comprising an output responsive to a sensed parameter; and a coded indication of a sensor light-off response for the sensed parameter. The sensor may be an exhaust gas sensor, such as an exhaust gas constituent sensor, and the coded indication of the sensor light-off response may include sensor-specific data particular to, and selected specifically for, the sensor. In this way, because the sensor provides a coded indication of its light-off response, systems using the sensor may be able to account for the manufacturing sensor to sensor variability in the sensed parameter. Therefore, the sensor may be used to accurately sense the sensed parameter even during the warm-up operation of the sensor, before reaching light-off. This can enable the sensor to be used for diagnosing engine and/or emission control system properties earlier in a vehicle drive cycle, for example, thus enabling improved vehicle diagnostics.

In another example, a method for decreasing the light-off time of a sensor is disclosed. The method comprises receiving sensed parameter data from the sensor, receiving encoded calibration data from the sensor, and adjusting a vehicle operating parameter in response to the sensed parameter data and the encoded calibration data. The encoded calibration data, which may correspond to a limited set of calibration codes indicating a sensor-specific light-off response for the sensed parameter, may be sent from the sensor to an engine control unit during the period after operation begins, but before the sensor reaches a stable light-off temperature. In this manner, the corresponding calibration data may be utilized to correct an otherwise degraded signal, thus reducing the amount of time to obtain useable output from the sensor.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to a method for controlling operation of a vehicle based on a sensor coupled in the exhaust system of the engine. The sensor includes a coded indication of the sensor light-off response, which in one example corresponds to sensor-specific data that is particular to and selected specifically for the sensor. After the sensor operation is started, the sensor may send the coded indication of the sensor light-off response (e.g., calibration data) to an engine control unit (ECU) or another controller via a controller area network (CAN) where it is decoded. The calibration data corresponding to the coded indication may then be applied to output of the sensor corresponding to a sensed parameter, in order to more accurately measure the sensed parameter.

Figure 1:
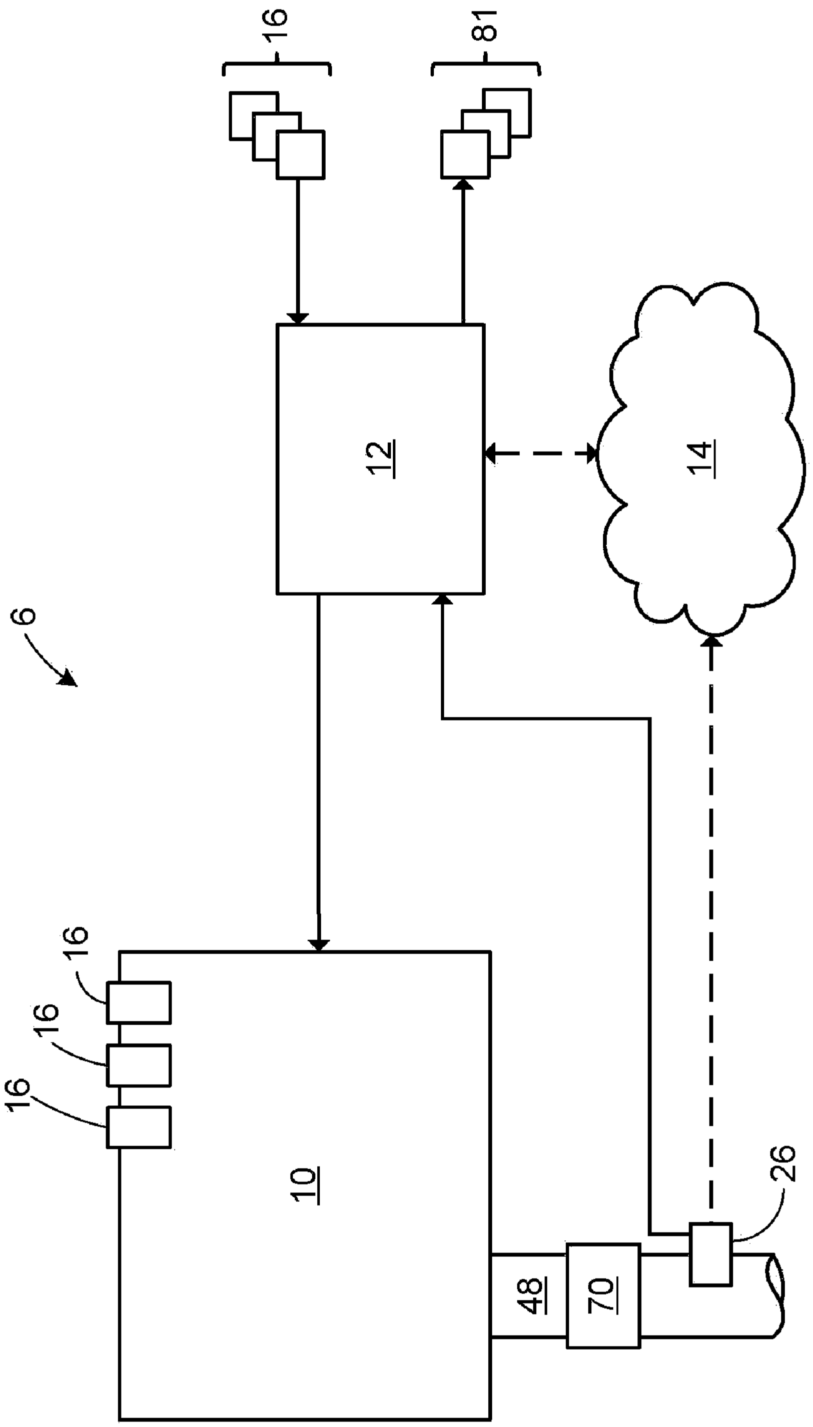
FIG. 1 shows a schematic diagram of an engine including an engine controller and a controller area network.
Figure 2:
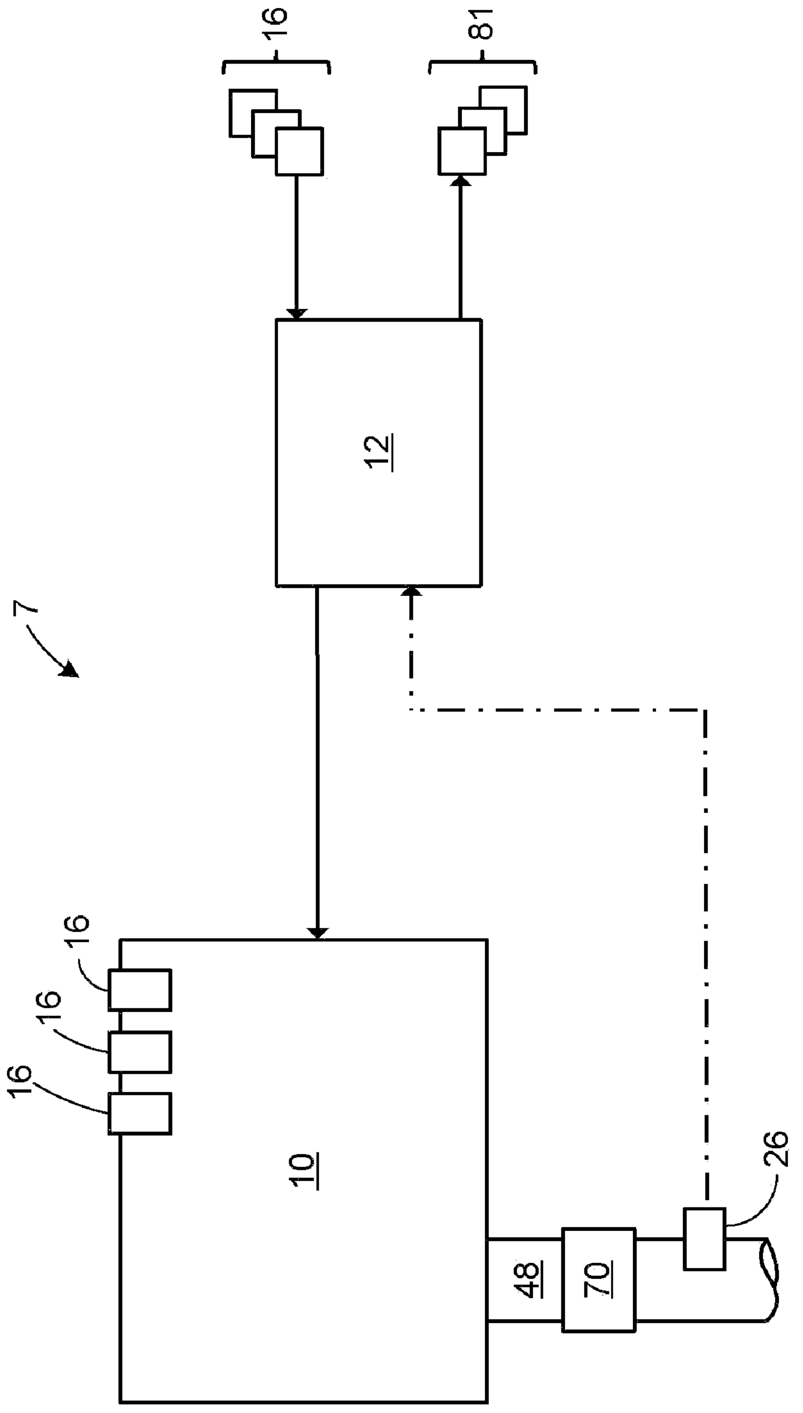
FIG. 2 shows a schematic diagram of an engine including an engine controller.
Figure 3:
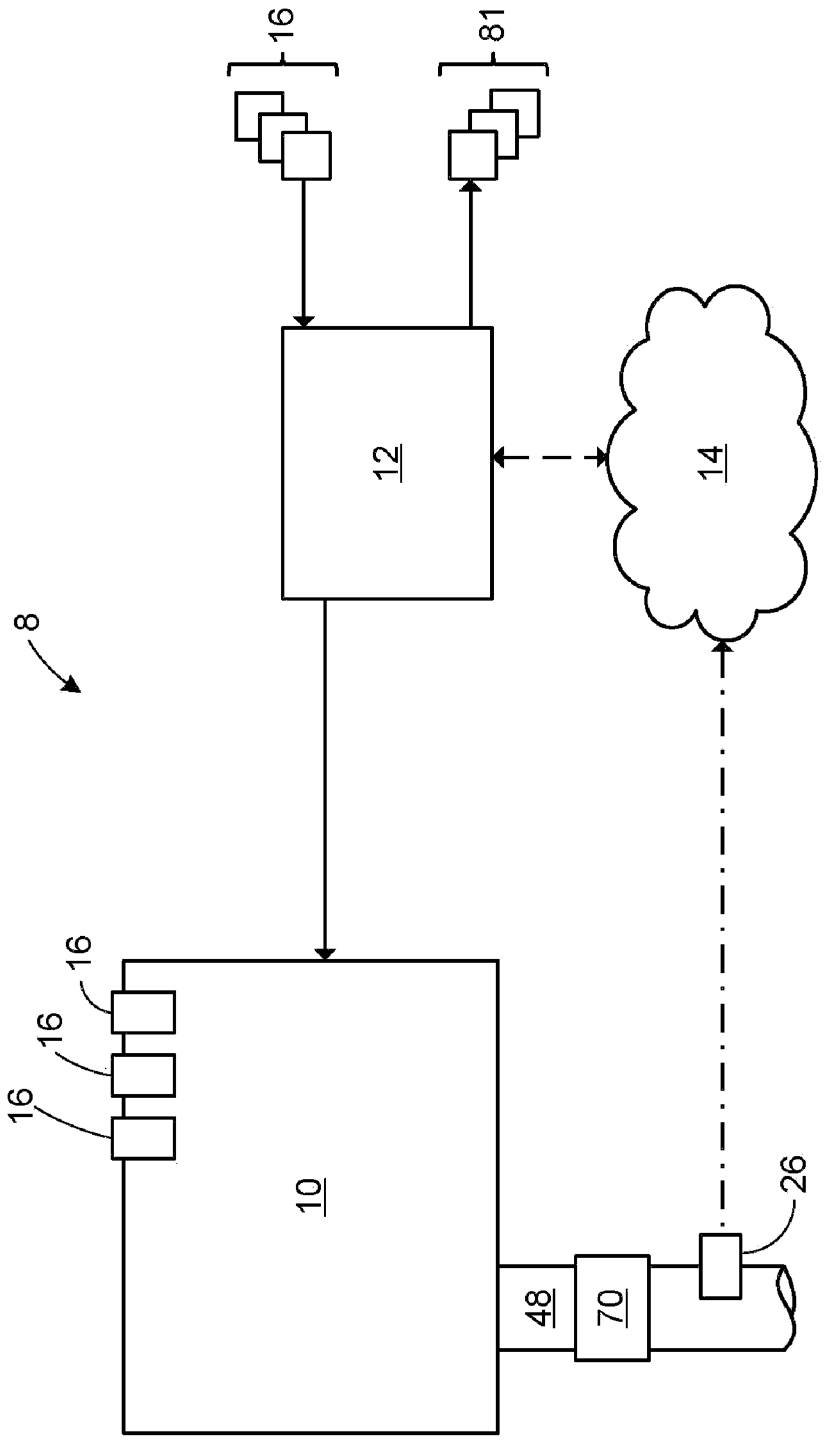
FIG. 3 shows a schematic diagram of an engine including an engine controller and a controller area network.

FIGS. 1-3 show schematic diagrams of a vehicle system 6. The vehicle system 6 includes an engine 10 which may be included in a propulsion system of an automobile, truck, etc. Engine 10 may be controlled at least partially by a control system including controller 12 and by input from a vehicle operator via an input device (not shown). The engine 10 includes an exhaust passage 48 eventually leading to a tailpipe (not shown) that routes exhaust gas to the atmosphere.

Engine 10 is shown coupled to exhaust passage 48 upstream of emission control device 70. Device 70 may be a diesel particulate filter (DPF), a three way catalyst (TWC), a $NO_x$ trap, a $NO_x$ catalyst, various other emission control devices, or combinations thereof. As an example, device 70 may be a selective catalytic reduction (SCR) system which operates to reduce NOx emissions by introducing a reductant, such as urea, into the exhaust gas stream. In some embodiments, during operation of engine 10, emission control device 70 may be periodically reset by operating at least one cylinder of the engine with a particular air-fuel ratio, or by adjusting injection of a reductant, such as urea, by a reductant injection system coupled to the exhaust (not shown).

The vehicle system 6 may further include a controller 12. Controller 12 in FIG. 1 may be a microcomputer, including microprocessor unit, input/output ports, an electronic storage medium for executable programs and calibration values (e.g., a read only memory chip), random access memory, keep alive memory, and a data bus. Storage medium read-only memory can be programmed with computer readable data representing instructions executable by the processor for performing the methods described below as well as other variants that are anticipated but not specifically listed. Herein, controller 12 may be referred to as engine control unit (ECU) 12.

Controller 12 is shown receiving information from a plurality of sensors 16 (various examples of which are described herein) and sending control signals to a plurality of actuators 81 (various examples of which are described herein). Controller 12 may further carry out diagnostic routines for determining degradation of components of the vehicle system 6, including determining degradation of the emission control device 70 based on sensed parameter data generated by exhaust gas sensor 26.

As one example, sensor 16 may include the exhaust gas sensor 26 located in exhaust passage 48 downstream of emission control device 70. Sensor 26 may be any suitable sensor for providing an indication of exhaust gas constituent, such as a linear oxygen sensor or UEGO (universal or wide-range exhaust gas oxygen), a two-state oxygen sensor or EGO, a HEGO (heated EGO), a $NO_x$, HC, CO, $NH_3$ sensor, etc. Furthermore, sensor 26 may include a heater for heating the sensor before light-off and/or for maintaining the operating temperature of the sensor during operation. In one particular example, sensor 26 is a heated sensor having a heater.

As another example, ECU 12 may receive various signals from sensors 16 coupled to engine 10, including measurement of inducted mass air flow (MAF) from a mass air flow sensor; engine coolant temperature (ECT) from a temperature sensor; a profile ignition pickup signal (PIP) from a Hall effect sensor (or other type); throttle position (TP) from a throttle position sensor; and absolute manifold pressure signal, MAP. Engine speed signal, RPM, may be generated by controller 12 from signal PIP. Manifold pressure signal MAP from a manifold pressure sensor may be used to provide an indication of vacuum, or pressure, in the intake manifold.

The actuators receiving control signals from controller 12 may include actuators for fuel injectors, control valves, and a throttle, for example.

As shown in FIGS. 1 and 3, vehicle system 6 may include a communication network, such as a controller area network (CAN) 14. CAN 14 may include various microprocessor units, electronic storage medium for executable programs and calibration values, memory, a data bus, etc., for communicating with one or more sensors, actuators, and/or controllers. In FIGS. 1 and 3, CAN 14 is shown receiving a signal from sensor 26 as well as sending and receiving signals from controller 12. Further, the flow charts in FIGS. 4-6 demonstrate control routines for each of the engine diagrams in FIGS. 1-3, respectively. Before discussing the control routines with reference to FIGS. 5-7, however, the flow chart in FIG. 4, which illustrates a control routine for a sensor, will be described.

Figure 4:
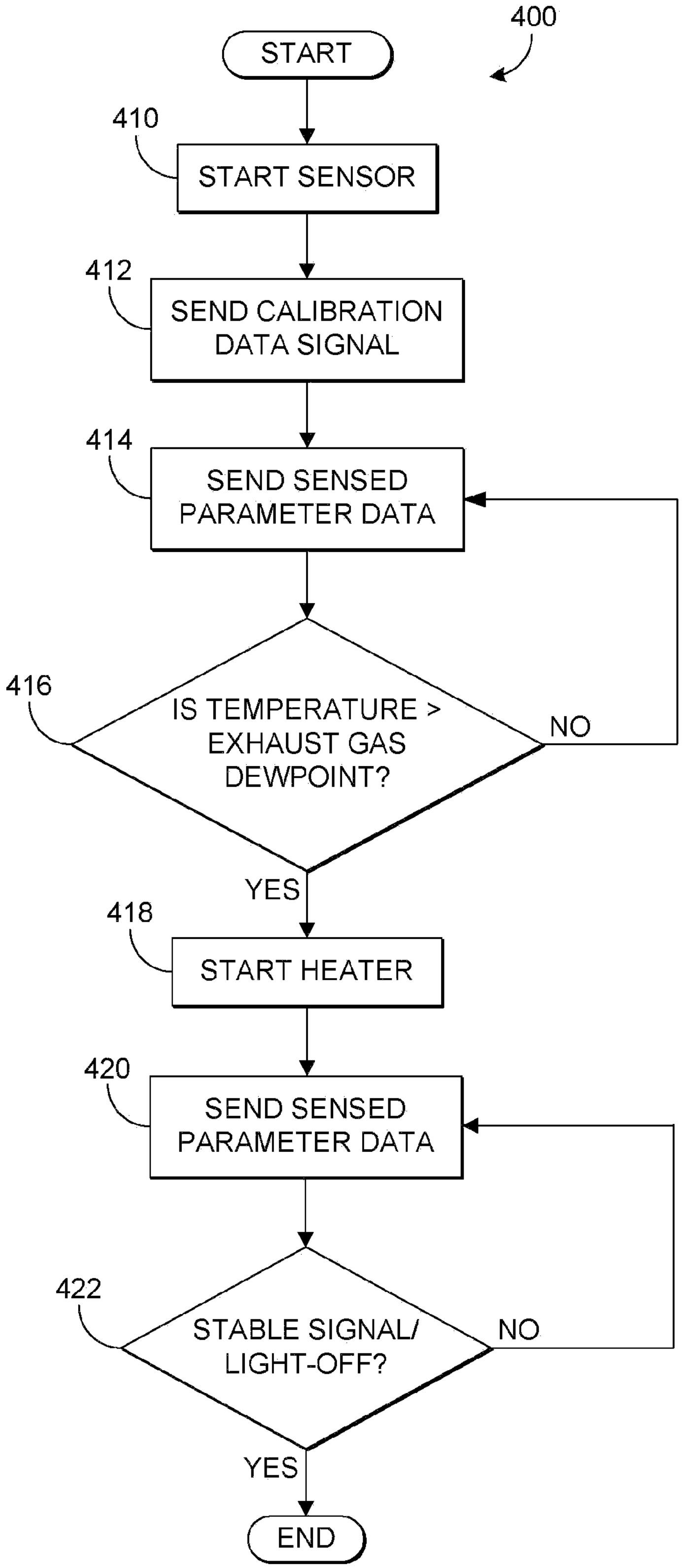
FIG. 4 shows a flow chart illustrating a routine for controlling a sensor during a cold engine start.

FIG. 4 shows a flow chart illustrating a control routine 400 for a sensor, such as sensor 26 depicted in FIGS. 1-3. Specifically, routine 400 demonstrates a method for controlling the sensor during a cold engine start. Herein, "cold start" refers to starting the engine under conditions in which the engine has cooled to ambient conditions, which may be relatively hot or cold.

At 410 of routine 400, the sensor is started. In some embodiments, the sensor may be started, at key-on. In other embodiments, the sensor may not be started for a predetermined amount time after the engine has started or after certain entry conditions are met by the ECU, for example, it is determined that the sensor is not degraded. Once the engine is started, the exhaust gas from the engine begins to flow through the exhaust system and heat the sensor. The amount of time it takes to heat the sensor to operating temperature (e.g., light-off) may depend on the location of the sensor. For example, a sensor that is located downstream of an emission control device (as shown in FIGS. 1-3) may take a longer amount of time to warm up than a sensor that is located upstream of an emission control device (e.g., closer to the combustion chambers). Further the ambient temperature at key-on may also affect the light-off time of the sensor. As an example, a sensor that starts at an ambient temperature of 30° C. may take less time to warm up than a sensor that starts at an ambient temperature of 0° C.

During the warm-up phase of the sensor, there may be an initial period where there may be no sensor signal, or no usable sensor signal. Following this initial period, there may be a period where there is a sensor signal, but the signal is unstable or partially degraded, where the sensor illustrates increased sensor to sensor variability and degraded output readings. In order to reduce the amount of time until the signal from the sensor is stable and accurate, and thus, may be utilized for applications such as on board diagnostics of an emission control device (e.g., a selective catalytic reduction (SCR) device), the sensor may have calibration data that may be sent to a controller, as will be described below.

Once the sensor is started, the sensor sends a calibration data signal at 412 of routine 400. As will be described later with reference to FIGS. 5-7, the sensor may send the calibration data signal to a controller area network (CAN) or an engine control unit (ECU), or both. The calibration data may be a coded indication of the sensor light-off response, and the light-off response may be sensor-specific data which is particular to, and selected specifically for, the sensor; thus, the calibration data may be unique to each sensor and one sensor may or may not have the same calibration data as another sensor that performs the same function. In one example, the sensor may be evaluated during manufacture and/or assembly of the sensor by a sensor supplier, and based on this evaluation, the sensor may be coded with a particular calibration data code from among a plurality of possible codes (e.g, the sensor may be coded with any one of three, four, etc. particular codes that best match that particular sensor's sensed parameter warm-up performance). As such, during operation in vehicle system 6, the sensor may be more accurately corrected so that the sensor output may be more accurately corrected, even while the sensor is warming up.

At 414 of routine 400 in FIG. 4, the sensor sends sensed parameter data. As stated above and as will be described later with reference to FIGS. 5-7, the sensor may send the sensed parameter data signal to a controller area network (CAN) or an engine control unit (ECU). The sensed parameter data is dependent on the type of sensor. In some embodiments, the sensor may be a sensor for detecting one or more specific exhaust gas constituents. As one example, the sensor may be a $NO_x$ sensor for which the sensed parameter is a concentration of $NO_x$. In another example, the sensor may be an ammonia sensor for which the sensed parameter is a concentration of ammonia.

Since the sensor is still in the warm-up phase, sensed parameter data that is sent to the CAN and/or ECU may be adjusted based on the calibration data, as will be described in more detail below.

After the sensor begins sending sensed parameter data to the CAN and/or the ECU, it is determined if the temperature of the sensor is greater than the dewpoint of the exhaust gas at 416 of routine 400. If the sensor temperature is less than the dewpoint of the exhaust gas, routine 400 returns to 414 and the sensor continues to send sensed parameter data that may be adjusted based on the calibration data of the sensor. If the sensor temperature is greater than the exhaust gas dewpoint, routine 400 proceeds to 418 where the sensor heater is started. In order to reduce degradation of the sensor, such as thermal shock due to water in the exhaust, the heater is not turned on until after the sensor temperature reaches the exhaust gas dewpoint temperature. The heater is started in order to increase the temperature of the sensor and to achieve a higher temperature than the exhaust gas, and thus light-off, at a faster rate than with the heat from exhaust gas alone. After the heater is started, routine 400 proceeds to 420 and the sensor continues to send sensed parameter data to the CAN and/or ECU that is adjusted based on the calibration data of the sensor.

At 422 of routine 400 in FIG. 4, it is determined if the sensor signal is stable and the sensor has reached light-off (e.g., the sensor has warmed-up to operating temperature). If the sensor has reached light-off, routine 400 ends. The sensor continues sending sensed parameter data to the CAN and/or ECU, however, the output of the sensor may no longer be adjusted based on the calibration data. On the other hand, if the sensor has not reached operating temperature, routine 400 returns to 420 where sensed parameter data is sent to the CAN and/or ECU and the data may be adjusted based on the calibration data of the sensor.

Figure 6:
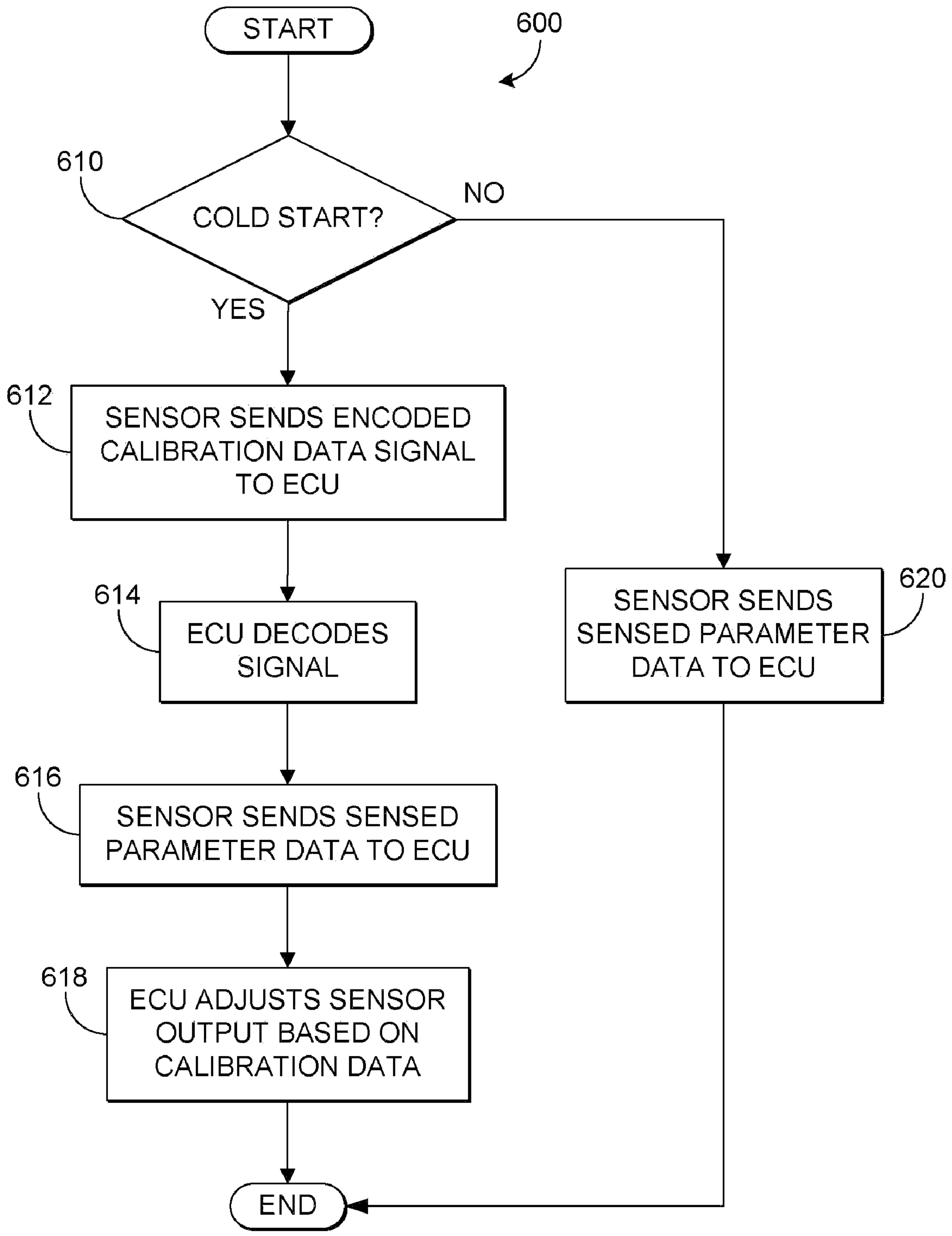
FIG. 6 shows a flow chart illustrating a second control routine for transmitting sensor calibration data.
Figure 7:
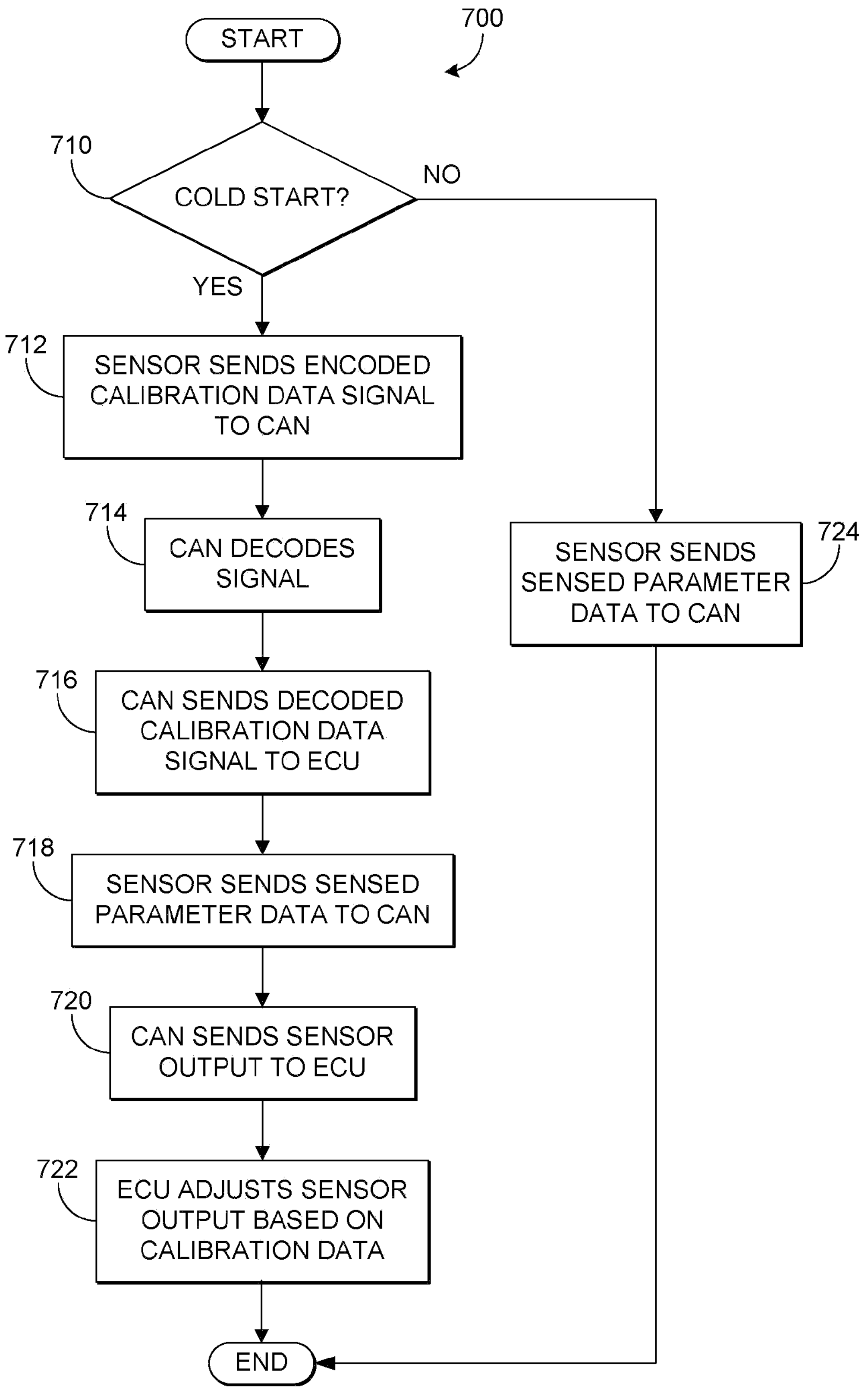
FIG. 7 shows a flow chart illustrating a third control routine for transmitting sensor calibration data.

As described above, encoded calibration data that is specific to the sensor in use may be transmitted to a controller and sensed parameter data that is output by the sensor may be adjusted based on the calibration data that corresponds to the encoded calibration data. For example, a controller may have a plurality of sets of temperature-based correction values, and the encoded calibration data may indicate which set of temperature-based correction values are to be used for a particular sensor. In this manner, sensor output may be adjusted so that it is more usable during a time when the signal is unstable before the sensor reaches light-off. Further, the encoded data signal can be a low resolution parameter code, such as a 2 or 3-bit number, yet significantly more precise correction values (e.g., indexed based on temperature, time, etc.) may then be selected for use in correcting the sensed parameter. The flow charts in FIGS. 5-7 illustrate the flow of information between the sensor and controller(s) for each of the configurations shown in FIGS. 1-3 in greater detail.

Figure 5:
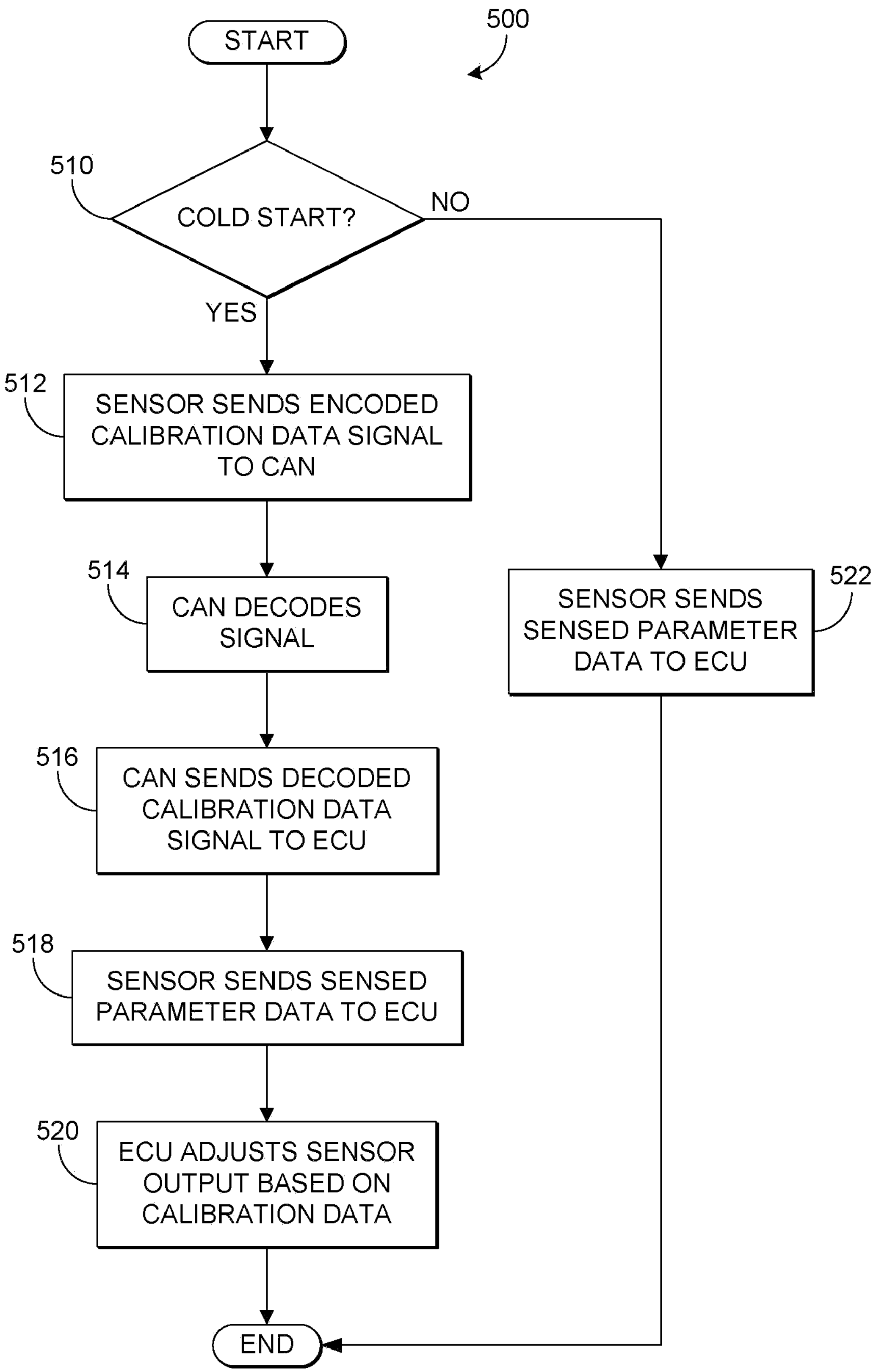
FIG. 5 shows a flow chart illustrating a first control routine for transmitting sensor calibration data.

First, the flow chart in FIG. 5 shows a first control routine 500 for transmitting sensor calibration data. Specifically, routine 500 illustrates a method for sending encoded calibration data which includes a light-off response of the sensor as depicted in FIG. 1. As shown in FIG. 1, sensor 26 communicates with the controller area network 14 and engine control unit 12. In such a configuration, the coded indication of the light-off response is included in a second, separate output of the sensor.

At 510 of routine 500 in FIG. 5, it is determined if the engine is operating under cold start conditions. Depending on a vehicle soak time, the engine and exhaust system may still be warm. In a situation in which the engine is warm, routine 500 advances to 522 where the sensor sends sensed parameter data to the engine control unit (ECU). If it is determined that the engine is under cold start conditions, however, routine 500 proceeds to 512.

At 512 of routine 500 in FIG. 5, the sensor sends an encoded calibration data signal to the controller area network (CAN). The calibration data signal path is indicated as a dashed line in FIG. 1. Next, the CAN (e.g., a processor on the CAN) decodes the calibration data signal after it is received from the sensor at 514. For example, the decoding may include matching the encoded data to one of a plurality of sets of predetermined calibration data, where the calibration data may include a sensor correction value at a given temperature, or a given light-off time. The CAN further communicates the decoded calibration data to the vehicle controller (e.g., the ECU) at 516 of routine 500. In some embodiments, the CAN may not decode the signal and, instead, may send the coded calibration data to the ECU for decoding.

Once the ECU receives the decoded calibration data, the sensor may send sensed parameter data to the ECU at 518 of routine 500. The sensed parameter data is indicated as a solid line between sensor 26 and controller 12 in FIG. 1.

At 520 of routine 500 in FIG. 5, the ECU adjusts the sensor output based on the calibration data corresponding to the encoded calibration data. For example, if the sensor is a $NO_x$ sensor, the output of the sensor may indicate there is an above normal concentration of $NO_x$ while it is warming-up, even though there is not an above normal concentration of $NO_x$ in the exhaust. Because the sensor has transmitted calibration data to the ECU via the CAN, the ECU may adjust the sensor output so that the accuracy of the data received from the sensor is increased and the output no longer indicates an above normal concentration of $NO_x$.

Figure 8:
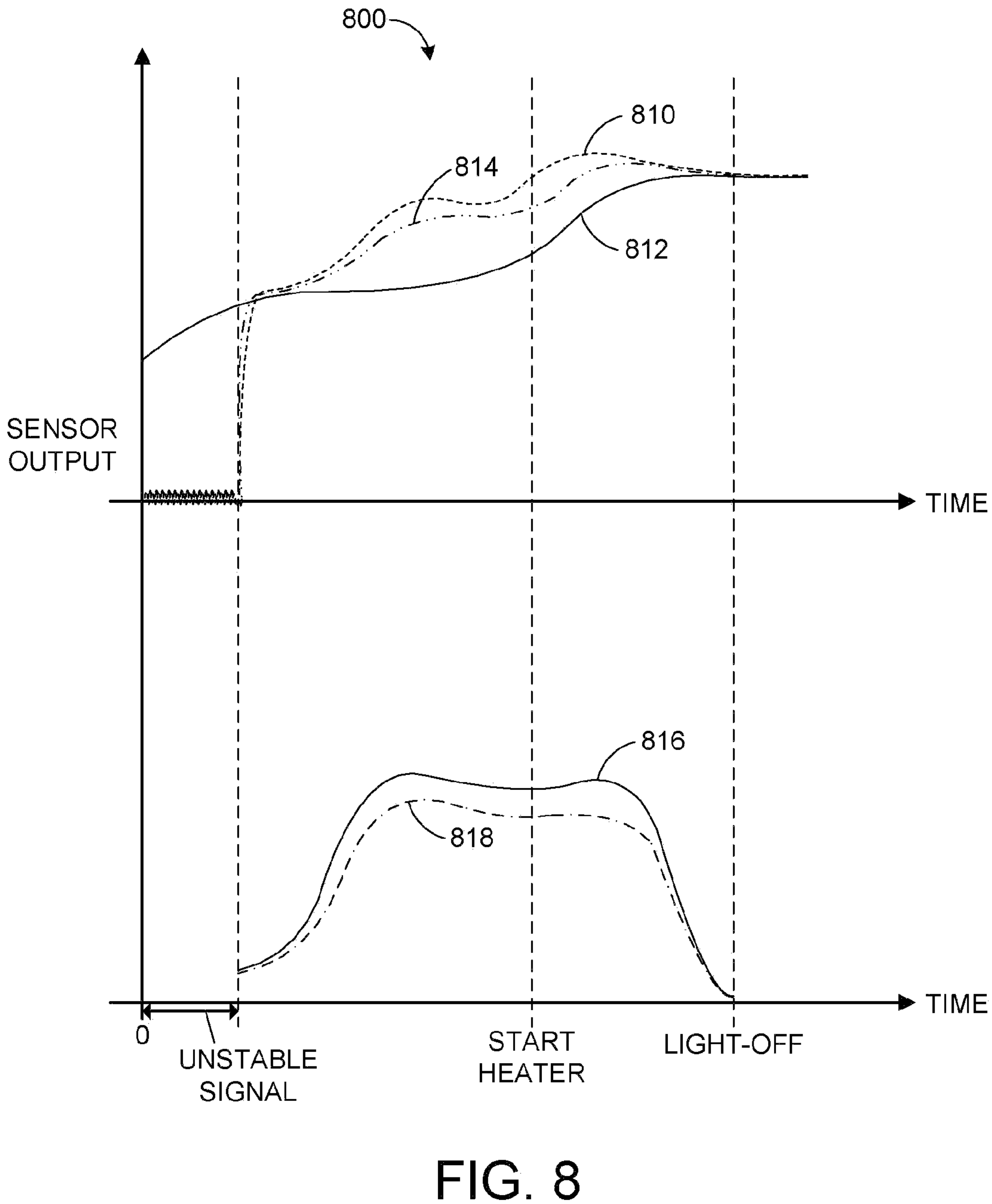
FIG. 8 shows a graph illustrating an example light-off curves and calibration data for a sensor.

The graph 800 in FIG. 8 shows example light-off curves for two sensors, such as sensor 26 in FIG. 1, in which the output of the sensor during warm-up indicates an above normal concentration of $NO_x$. The solid curve 812 in FIG. 8 shows the actual $NO_x$ concentration in the exhaust during the sensor warm-up. The dashed curve 810 shows the sensed parameter data (e.g., $NO_x$ concentration) for $NO_x$ sensor 1 and the dashed and dotted curve 814 shows the sensed parameter data for $NO_x$ sensor 2. Further, the solid curve 816 shows calibration data for sensor 1 and the dashed and dotted curve 818 shows calibration data for sensor 2. Curves 816 and 818 may represent two of the plurality of calibration data sets corresponding to different codes. Thus, first encoded calibration data (e.g., a first three bit binary code, such as 001) generated from sensor 1 may indicate that the sensor best matches curve 816, whereas a second code (e.g., a second three bit binary code, such as 010) generated from sensor 2 may indicate that the second sensor best matches curve 818. In this way, the control system can correct the sensor with calibration date selected specifically for that sensor, without necessarily storing all of the calibration on the sensor. However, in an alternative embodiment, the sensor itself may store the entire specific calibration data set and transmit such to the control system or it may send polynomial equation constants to the ECU that can then be used to create the calibration curves 816 and 818 depending on the value of the constants.

Moving on to FIG. 6, the flow chart in FIG. 6 illustrates a second control routine 600 for transmitting sensor calibration data. Specifically, routine 600 illustrates a method for sending calibration data which includes a light-off response of the sensor as depicted in FIG. 2. As shown in FIG. 2, sensor 26 is in communication with engine control unit 12 and vehicle system 6 does not include a controller area network. In such a configuration, a coded indication of the light-off response is encoded in the output of the sensor.

At 610 of routine 600 in FIG. 6, it is determined if the engine is operating under cold start conditions. As described above, if the engine is still warm, routine 600 advances to 620 where the sensor sends sensed parameter data to the ECU. If, instead, it is determined that the engine is under cold start conditions, routine 600 continues to 612.

At 612 of routine 600, the sensor sends an encoded calibration data signal to the ECU. The encoded calibration data signal is indicated by a dashed and dotted line in FIG. 2. In some embodiments, the coded indication of the light-off response may be generated by a selectable resistance of the sensor output. For example, the sensor may use a separate wire and pin the ECU header to detect the resistance of the resistor in the sensor connector. Thus, during manufacturing of the sensor, for example, the sensor 26 may be modified with a particular resistor having a resistance that is best coded to the light-off calibration required for that particular sensor to account for sensor to sensor variability. In other embodiments, the coded indication of the light-off response may be a separate electrical signal or a portion of an electrical signal. For example, a % duty cycle signal may be utilized for the concentration signal, and the coded light-off information may be coded in a frequency of the signal, or vice versa. Further, where a DC voltage represents concentration, a frequency signal can be superimposed onto the analog DC voltage signal to represent the coded light-off information.

Once the ECU receives the encoded calibration data signal, the signal is decoded by the ECU at 614 of routine 600. The sensor then begins to send sensed parameter data to the ECU at 616. As stated above, the sensed parameter data depends on the type of sensor and the sensor may be one of a variety of sensors including, but not limited to, exhaust gas constituent sensors such as a $NO_x$ sensor. Upon receiving sensed parameter data from the sensor, the ECU may adjust the sensor output based on the calibration data.

Finally, the flow chart in FIG. 7 illustrates a third control routine 700 for transmitting sensor calibration data. Specifically, routine 700 shows a method for sending calibration data which includes a light-off response of the sensor as depicted in FIG. 3. As shown in FIG. 3, sensor 26 is in communication with engine control unit 12 and controller area network 14. In such a configuration, the coded indication of the light-off response is encoded in the output of the sensor.

At 710 of routine 700 in FIG. 7, it is determined if the engine is operating under cold start conditions. If the engine is not under cold start conditions, routine 700 advances to 724 where the sensor sends sensed parameter data to the CAN. On the other hand, if the engine is under cold start conditions, routine 700 proceeds to 712 where the sensor sends an encoded calibration data signal to the CAN (indicated by a dashed and dotted line in FIG. 3). Once the CAN receives the calibration data, the CAN decodes the signal at 714 of routine 700 and then sends a decoded calibration data signal to the ECU at 716 (indicated by a dashed line in FIG. 3). In some embodiments, the CAN may not decode the calibration data and, instead, the CAN sends the coded calibration data to the ECU where it is decoded.

At 716 of routine 700, the sensor begins sending sensed parameter data to the controller area network (CAN). Subsequently, the CAN sends the sensor output to the engine control unit (ECU) at 720. Sensed parameter data that the ECU receives after receiving the decoded calibration data may be adjusted based on the calibration data at 722 of routine 700.

As demonstrated by the control routines of FIGS. 5-7 and by the configurations illustrated in FIGS. 1-3, there is a plurality of ways in which a sensor may communicate calibration data to a controller. Once the controller receives the calibration data from the sensor, subsequent sensor output may be adjusted by the ECU based on the calibration data. After adjusting the sensor output, the ECU may adjust an actuator in response to the adjusted sensor output signal, as will be described with reference to FIG. 9.

Figure 9:
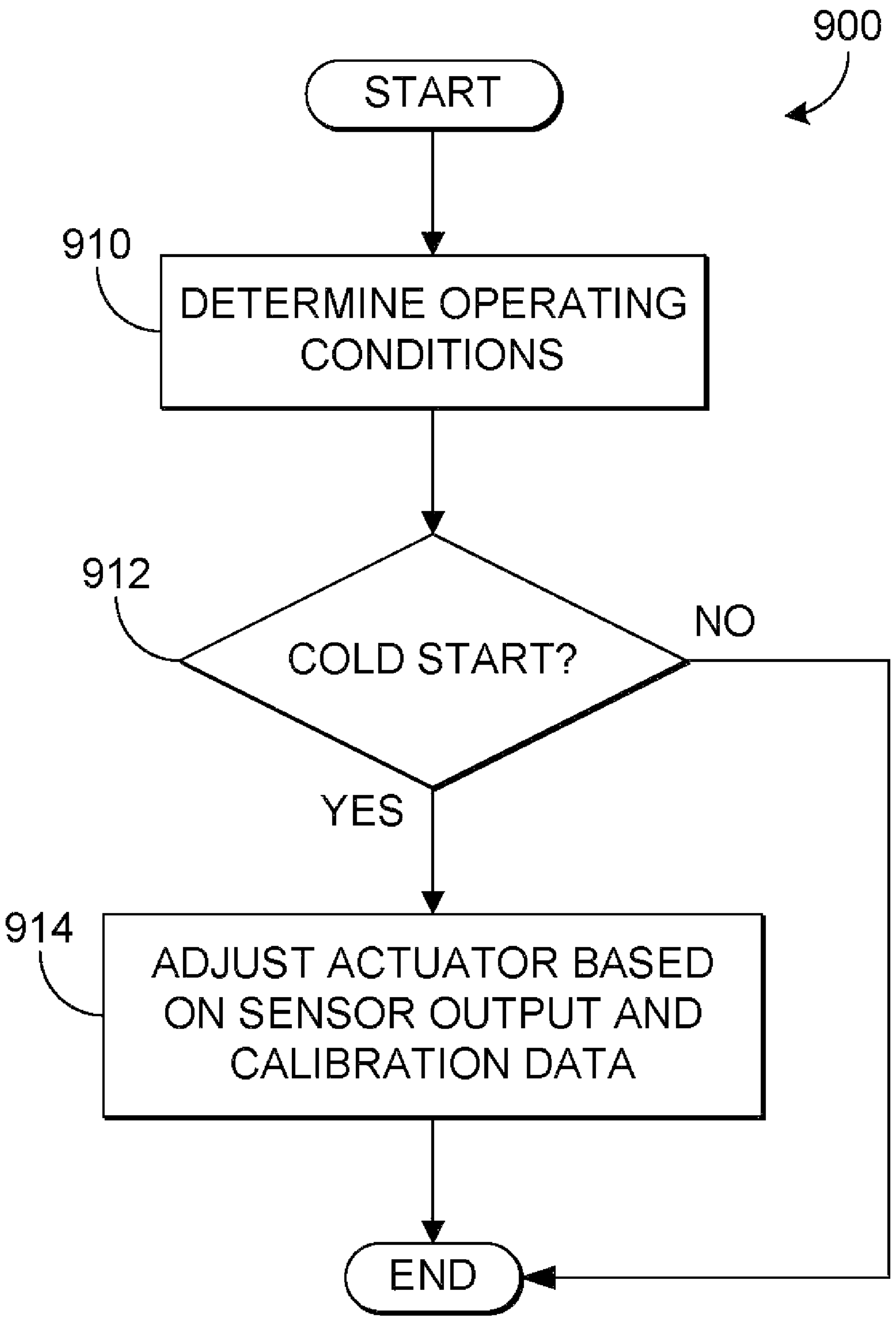
FIG. 9 shows a flow chart illustrating a routine for controlling an actuator based on sensor data.

FIG. 9 shows a flow chart illustrating a control routine 900 for adjusting an actuator. Specifically, routine 900 adjusts an actuator based on sensor output and calibration data under cold start conditions. The actuator may control a vehicle operating parameter, such as spark timing.

At 910 of routine 900, engine operating conditions are determined. Engine operating conditions may include, but are not limited to, air-fuel ratio and spark timing.

Once the engine operating conditions are determined, routine 900 proceeds to 912 where it is determined if the engine is under cold start conditions. If the engine is not under cold start conditions (e.g., the engine is warm) routine 900 ends. If the engine is warm due, for example, to a short soak time or if the engine has been running for a length of time and the sensor has already reached light-off, the output of the sensor may not benefit from an adjustment based on the calibration data indicating the light-off response of the sensor.

Alternatively, if it is determined that the engine is under cold start conditions, routine 900 of FIG. 9 continues to 914. At 914, one or more actuators may be adjusted based on the output of the sensor and the sensor calibration data. As an example, a $NO_x$ sensor may be positioned downstream of an SCR device so as to detect a concentration of $NO_x$ in the exhaust flowing out of the SCR device (i.e., to ensure the device is effectively removing $NO_x$ from the exhaust gases). The adjusted $NO_x$ sensor output may indicate an increase in the amount of $NO_x$ exiting the SCR device. In response, an actuator coupled to the SCR device may be adjusted to inject a greater amount of urea to react with $NO_x$ in the exhaust gases entering the SCR device and reduce the amount of $NO_x$ exiting the catalyst.

In another example, an oxygen sensor may be positioned in the exhaust manifold upstream of an emission control device so as to detect an air-fuel ratio of the exhaust gas exiting the combustion chambers. During a cold start, after the sensor output is adjusted based on the calibration data, the oxygen sensor may indicate an air-fuel ratio that is leaner than a desired air-fuel ratio. In response to the adjusted oxygen sensor output, an actuator coupled to a fuel injector may be adjusted to increase the amount of fuel injected to the cylinder, thus generating a less lean air-fuel ratio in the exhaust. In some examples, an actuator may be adjusted to advance or retard the spark timing in order to generate a less lean air-fuel ratio.

As described herein, a sensor may include coded calibration data which is specific to the sensor and that indicates the light-off response of the sensor. The calibration data may be sent to a controller where it is decoded and the information may be used to transform the output signal of the sensor during cold start engine conditions in order to generate a usable sensor signal in a shorter amount of time than it takes for the sensor to light-off. Further, various actuators may be adjusted based on the transformed (e.g., adjusted) sensor signal.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

The invention claimed is:

1. A sensor, comprising:

an output responsive to a sensed parameter; and a coded indication of a sensor light-off temperature response for the sensed parameter.

2. The sensor of claim 1, where the sensor is an exhaust gas sensor, and where the coded indication of the sensor light-off temperature response includes sensor-specific data particular to, and selected specifically for, the sensor, the data stored in sensor electronics.

3. The sensor of claim 2, where the exhaust gas sensor is a $NO_x$ sensor and the sensed parameter is a concentration of $NO_x$, and where the sensor includes a heater.

4. The sensor of claim 2, wherein the coded indication of the light-off temperature response is included in a second, separate output of the sensor.

5. The sensor of claim 2, wherein the coded indication of the light-off temperature response is encoded in the output.

6. The sensor of claim 5, wherein the coded indication of the light-off temperature response is generated by a selectable resistance of the sensor output.

7. The sensor of claim 5, wherein the coded indication of the light-off temperature response is a separate controller area network signal.

8. The sensor of claim 5, wherein the coded indication of the light-off temperature response is a separate electrical signal.

9. A device comprising:

a sensor, including:

an output responsive to a sensed parameter; and a coded indication of a sensor light-off temperature response for the sensed parameter.

10. The device of claim 9, where the sensor is an exhaust gas sensor, and where the coded indication of the sensor light-off temperature response includes sensor-specific binary data particular to, and selected specifically for, the sensor, the coded indication stored in the sensor.

11. The device of claim 10, where the exhaust gas sensor is a $NO_x$ sensor and the sensed parameter is a concentration of $NO_x$, and where the sensor includes a heater.

12. The device of claim 10, wherein the coded indication of the light-off temperature response is included in a second, separate output of the sensor.

13. The device of claim 10, wherein the coded indication of the light-off temperature response is encoded in the output.

14. The device of claim 13, wherein the coded indication of the light-off temperature response is generated by a selectable resistance of the sensor output.

15. The device of claim 13, wherein the coded indication of the light-off temperature response is a separate controller area network signal.

16. The device of claim 13, wherein the coded indication of the light-off temperature response is a separate electrical signal.

* * * * *